United States Patent
Dautermann et al.

(10) Patent No.: US 11,176,835 B2
(45) Date of Patent: Nov. 16, 2021

(54) METHOD AND APPARATUS FOR PROVIDING AN AIRCRAFT WITH DATA FOR A SATELLITE NAVIGATION-BASED AUTOMATIC LANDING

(71) Applicant: Deutsches Zentrum fuer Luft- und Raumfahrt e.V., Cologne (DE)

(72) Inventors: Thomas Dautermann, Meine OT Abbesbuettel (DE); Robert Geister, Meine OT Abbesbuettel (DE); Thomas Ludwig, Braunschweig (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 238 days.

(21) Appl. No.: 15/974,790

(22) Filed: May 9, 2018

(65) Prior Publication Data
US 2018/0261110 A1    Sep. 13, 2018

Related U.S. Application Data

(63) Continuation of application No. PCT/EP2016/075010, filed on Oct. 19, 2016.

(30) Foreign Application Priority Data

Nov. 10, 2015   (DE) ............... 10 2015 119 308.6

(51) Int. Cl.
  *G08G 5/02*   (2006.01)
  *G01S 19/07*   (2010.01)
  (Continued)

(52) U.S. Cl.
  CPC ............ *G08G 5/025* (2013.01); *G01S 19/07* (2013.01); *G01S 19/15* (2013.01); *G08G 5/0026* (2013.01)

(58) Field of Classification Search
  CPC ...... G08G 5/025; G08G 5/0026; G01S 19/15; G01S 19/07
  See application file for complete search history.

(56) References Cited

U.S. PATENT DOCUMENTS 5,343,209 A * 8/1994 Sennott ............... G01S 19/42
                                                342/357.29
5,436,632 A * 7/1995 Sheynblat ............ G01S 5/02
                                                342/357.64
(Continued)

FOREIGN PATENT DOCUMENTS

DE   10 2012 007 202 B4   5/2014

OTHER PUBLICATIONS

Todd Walter et al.: The Advantages of Local Monitoring and VHF Data Broadcast for SBAS, Proceedings of the European Navigation Conference GNSS 2005, Jul. 19-22, 2005, pp. 1-15.
(Continued)

*Primary Examiner* — Behrang Badii
*Assistant Examiner* — Daniel L Greene
(74) *Attorney, Agent, or Firm* — Thomas | Horstemeyer, LLP

(57) ABSTRACT

In order to provide an aircraft with GLS (GBAS (Ground-Based Augmentation System) Landing System) data packets for a satellite navigation-based automatic landing, the GLS data packets comprising GBAS correction data for a satellite navigation and FAS data that describes a set approach path of the aircraft, SBAS (Satellite-Based Augmentation System) correction data for the satellite navigation are received from an SBAS satellite. The received SBAS correction data are converted into GBAS correction data. The GBAS correction data obtained by the conversion are combined with the FAS data in the GLS data packets. The GLS data packets are transmitted to the aircraft via a radio link.

8 Claims, 1 Drawing Sheet

(51) Int. Cl.
  *G01S 19/15* (2010.01)
  *G08G 5/00* (2006.01)

(56) References Cited

U.S. PATENT DOCUMENTS

| | | | | |
|---|---|---|---|---|
| 5,563,917 | A * | 10/1996 | Sheynblat | G01S 19/07 342/358 |
| 5,596,328 | A * | 1/1997 | Stangeland | G01S 19/07 342/352 |
| 5,786,773 | A * | 7/1998 | Murphy | G01S 19/07 340/947 |
| 6,205,377 | B1 * | 3/2001 | Lupash | G01S 19/20 342/357.58 |
| 6,405,132 | B1 * | 6/2002 | Breed | G01S 7/4802 701/301 |
| 6,449,558 | B1 * | 9/2002 | Small | G01S 19/11 701/470 |
| 6,735,523 | B1 * | 5/2004 | Lin | G01S 19/23 342/357.31 |
| 9,031,725 | B1 * | 5/2015 | DiEsposti | G01C 21/20 701/22 |
| 2003/0058163 | A1 * | 3/2003 | Zimmerman | G01S 5/009 342/357.72 |
| 2006/0206246 | A1 * | 9/2006 | Walker | G06Q 10/00 701/16 |
| 2010/0008243 | A1 * | 1/2010 | Viswanath | H04L 5/0007 370/252 |
| 2010/0013701 | A1 * | 1/2010 | Fischer | G01S 19/03 342/357.43 |
| 2013/0079958 | A1 | 3/2013 | Neri et al. | |
| 2013/0335266 | A1 * | 12/2013 | Vollath | G01S 19/41 342/357.25 |
| 2015/0081143 | A1 | 3/2015 | Snow et al. | |
| 2015/0236726 | A1 * | 8/2015 | Sankaranarayanan | H03M 13/1111 714/780 |
| 2016/0011318 | A1 * | 1/2016 | Cohen | G01S 19/45 342/357.26 |

OTHER PUBLICATIONS

Graeme K. Crosby et al.: A Ground-based Regional Augmentation System (GRAS)—The Australian Proposal. GPS 2000, Proceedings of the 13th International Technical Meeting of Navigation (ION GPS 2000), The Institute of Navigation, Sep. 22, 2000, pp. 713-721.

* cited by examiner

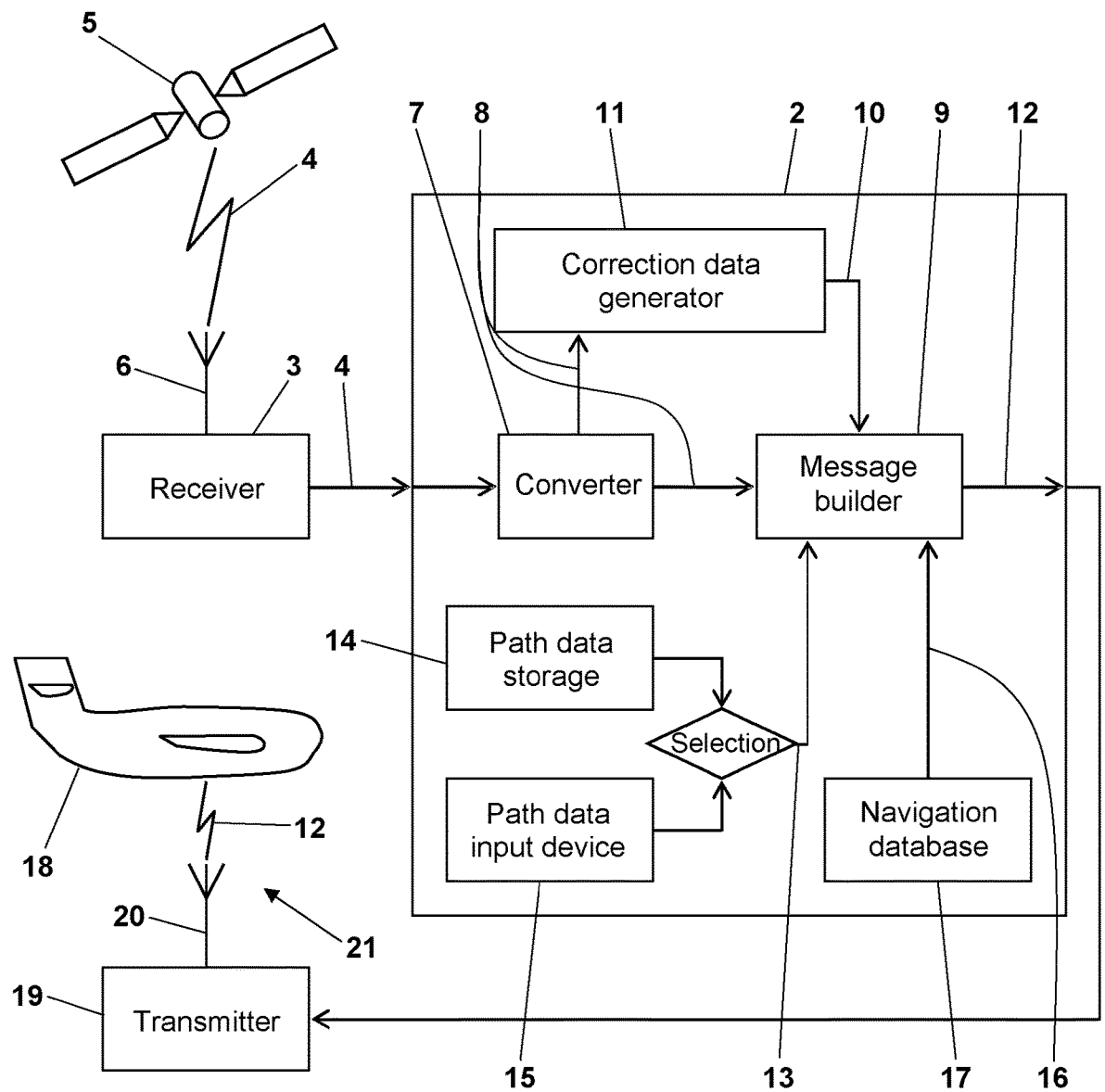

METHOD AND APPARATUS FOR PROVIDING AN AIRCRAFT WITH DATA FOR A SATELLITE NAVIGATION-BASED AUTOMATIC LANDING

CROSS REFERENCE TO RELATED APPLICATIONS

This application is a continuation to International Patent Application PCT/EP2016/075010, entitled "Method and device for providing an aircraft with data for a satellite navigation-based automatic landing", filed on Oct. 19, 2016 and claiming priority to German Patent Application DE 10 2015 119 308.6, entitled "Verfahren and Vorrichtung zum Bereitstellen von Daten für eine Satellitennavigation-basierte automatische Landung an ein Flugzeug" and filed on Nov. 10, 2015.

FIELD

The present invention relates to a method of providing GLS (GBAS (Ground-Based Augmentations System) Landing System) data packets for a satellite navigation-based automatic landing to an aircraft, wherein the GLS data packets include GBAS correction data for the satellite navigation and FAS (Final Approach Segment) data which describe a set approach path of the aircraft and wherein the GLS data packets are transmitted to the aircraft via a radio link.

Further, the invention relates to an apparatus for providing GLS (GBAS Landing System) data packets for a satellite navigation-based automatic landing to an aircraft, the apparatus comprising a message builder which merges GBAS correction data for the satellite navigation and FAS data describing a set approach path for a satellite navigation-based automatic landing of an aircraft, and a transmitter transmitting the GLS data packets to the aircraft via a radio link.

BACKGROUND OF THE INVENTION

In GNSS (Global Navigation Satellite System) satellite navigation, position errors of many meters may occur if the signal runtimes of the GNSS signals transmitted by the GNSS satellites are evaluated only. These errors are due to various reasons like atmospheric fluctuations, varying positions of the GNSS satellites and inaccuracies in signal generation.

In the GBAS (Ground-Based Augmentation System), the GNSS signals transmitted by the various GNSS satellites are received by reference receivers with exactly known positions. From a comparison of the measured distances to the satellites which are determined from the GNSS signals and the actual positions of the reference receivers at which the GNSS signals have been received, GBAS correction data are determined which are valid in a radius of, typically, 50 km. With these correction data, other receivers of the GNSS signals are enabled to determine their positions at a high accuracy (in the order of one meter) based on the GNSS signals received from the GNSS satellites. Thus, for example, an aircraft may determine its position in all spatial directions at a sufficient accuracy to execute a satellite navigation-based automatic landing, if such GBAS correction data are available.

In a GLS (GBAS Landing System), GLS data packets are transmitted to an aircraft for a satellite navigation-based automatic landing, which, besides GBAS correction data determined on the ground, include FAS (Final Approach Segment) data which describe a set approach path. In the GLS, the GLS data packets are transmitted from a transmitter at the ground to a receiver in the aircraft via a VHF radio link and forwarded by the receiver directly to the autopilot of the aircraft. Thus, the autopilot, together with the GNSS of the aircraft, has all information required for the automatic satellite navigation-based landing of the aircraft.

The efforts to be spent for the installation of a GLS at an airport are high due to the necessity to provide reference receivers at known positions and connect these reference receivers to a central unit.

In the so-called SBAS (Satellite-Based Augmentation System), SBAS correction data for the GNSS satellite navigation are transmitted directly by a dedicated special geostationary satellite. These SBAS correction data are valid for a larger area. They allow for a nearly as good position determination in satellite navigation as the GBAS.

To use the SBAS for a position determination of aircrafts, a special receiver for the SBAS correction data has to be provided in the respective aircraft. Further, data connections have to be provided via which deviations from the set approach path are provided to the autopilot of the aircraft. For this purpose, a device which calculates the deviations from the set approach path needs FAS data with regard to the respective set approach path. For this purpose, a corresponding database is provided in the aircraft as the FAS data are not separately transmitted to the aircraft from the outside. All these data transmission ways and devices have to be officially approved. At present, it is not possible to continue automatic precision approaches of aircrafts applying an SBAS-based position determination up to the automatic landing as the onboard database and the connections from the database to the autopilot do not comply with the official approval requirements. Instead, automated SBAS precision approaches are aborted at a height of 250 feet.

German patent description DE 10 2012 007 202 B4 discloses a method of and an apparatus for generating integrity information for fulfilling increased integrity requirements in a GNSS-based position determination. The method includes a calculation of possible position bias values due to the combination of bias values of error distributions of GNSS-based pseudo distance measurements in a certain area via a projection using a design matrix for the certain area. Further, the method includes the generation of the integrity information for fulfilling increased integrity requirements by subtracting the determined possible position bias values due to the combination of bias values from alert limits. The generated integrity information, i.e. the reduced alert limits and/or increased protection levels may be transmitted as FAS datasets from ground stations of a supplemental system installed at airports or with the signals of an SBAS, distributed and thus received and evaluated by suitable SBAS receivers installed in aircrafts. Alternatively, the reduced alert limits may be stored in a database in a flight management system (FMS) of the aircraft and thus be made available to the SBAS/GBAS receiver and the FMS. An apparatus for executing the method may be installed in a ground station of a GBAS so that the integrity information may be distributed by the ground station within a certain area, like for example the surroundings of an airport.

US patent application publication US 2013/0079958 A1 discloses a method of and an apparatus for determining the position of an aircraft during landing. During landing, the aircraft is guided by position information which is received from a GNSS satellite navigation system. This information may be combined with information from a support system, particularly an SBAS, an ABAS or a GBAS.

There still is a need of a method and an apparatus which enable a satellite navigation-based automatic landing of aircrafts which are designed and approved for the GLS on airports without GLS.

SUMMARY OF THE INVENTION

The present invention relates to a method of providing GLS (GBAS Landing System) data packets for a satellite navigation-based automatic landing of an aircraft, wherein the GLS data packets include GBAS (Ground-Based Augmentation System) correction data for a satellite navigation and FAS (Final Approach Segment) data describing a set approach path of the aircraft. The method comprises receiving SBAS (Satellite-Based Augmentation System) correction data for the satellite navigation from an SBAS satellite, converting the received SBAS correction data into GBAS correction data, merging the GBAS correction data obtained by converting the SBAS correction data with the FAS data describing the set approach path to form GLS data packets, and transmitting the GLS data packets to the aircraft via a radio link.

Further, the present invention relates to an apparatus for providing GLS (GBAS Landing System) data packets for a satellite navigation-based automatic landing to an aircraft, wherein the GLS data packets include GBAS (Ground-Based Augmentation System) correction data for a satellite navigation and FAS (Final Approach Segment) data, which describe a set approach path of the aircraft. The apparatus comprises a receiver configured to receive SBAS correction data for the satellite navigation from an SBAS satellite, a converter connected to the receiver and configured to convert the SBAS correction data received by the receiver into GBAS correction data, a message builder connected to the converter and configured to combine the GBAS correction data for the satellite navigation received by the converter with FAS data, which describe the set approach path of the aircraft, to form GLS data packets for the satellite navigation-based automatic landing of the aircraft, and a transmitter connected to the message builder and configured to transmit the GLS data packets to the aircraft via a radio link.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawing. The components in the drawing are not necessarily to scale, emphasis instead being placed upon clearly illustrating the principles of the present invention.

FIG. 1 is a block diagram which both illustrates the method according to the invention and the design of an apparatus according to the invention.

DETAILED DESCRIPTION

In a method according to the invention for providing GLS (GBAS Landing System) data packets for a satellite navigation-based automatic landing to an aircraft, the GLS data packets including GBAS (Ground-Based Augmentation System) correction data for a satellite navigation, particularly a GNSS (Global Navigation Satellite System) satellite navigation, and FAS (Final Approach Segment) data which describe a set approach path of the aircraft, SBAS (Satellite-Based Augmentation System) correction data for the satellite navigation are received from an SBAS satellite. The received SBAS correction data are converted into GBAS correction data. The GBAS correction data obtained by converting the received SBAS correction data are merged with the FAS data to form the GLS data packets. The GLS data packets are then transmitted to the aircraft via a radio link.

In the aircraft, these GLS data packets are not distinguishable from GLS data packets which include correction data which have originally been generated in a GBAS. The aircraft, i.e. its autopilot, may use the GLS data packets for a common GLS landing, i.e. for a precision approach which may be continued up to the final landing of the aircraft. There is no need of alterations in the aircraft with regard to an aircraft already designed and approved for GLS landings.

At the same time, the provision of the GLS data packets, i.e. of data packets according to the GLS standard, does without any laborious generation of GBAS correction data with a usual GBAS, i.e. by means of several reference receivers at fixed positions. Instead, the method according to the invention may be carried out at a single location whose position needs not to be exactly known.

Further, it has been proven that the conversion of SBAS correction data into GBAS correction data is generally without problem. An approval of the method according to the invention for automatic landings of aircrafts should thus also be possible without problem. Here, a single approval of the method or a corresponding apparatus should be sufficient, i.e. an approval which is independent on the location of the application of the invention should be possible.

In converting the SBAS correction data into GBAS correction data, correction data may be complemented, which are missing in the correction data according to the SBAS standard. These missing correction data may, for example, be generated by extrapolation from the present SBAS correction data or by processing these present SBAS correction data in any other way.

For the FAS data which describe the set approach path of the aircraft, raw data of the set approach path may be taken from a path data storage or from a path input device. The path input device may not only be used for inputting a completely new set approach path but also for selecting one of several set approach paths for which data are stored in the path data storage.

The raw data for the set approach path may be combined with data from a navigation database to form FAS data describing the set approach path.

All steps of the method according to the invention may be carried out on the ground so that the method, for the aircraft, does not differ from the provision of GLS data packets in the usual way by means of an GBAS.

Generally, however, it is also possible to carry out the method according to the invention in an aircraft. For this purpose, an apparatus according to the invention is installed in the aircraft. This apparatus according to the invention installed in the aircraft also transfers the GLS data packets via the radio link to those parts of the aircraft implementing the GLS. The apparatus according to the invention is completely separated from those parts of the aircraft implementing the GLS.

The apparatus according to the invention for carrying out the method according to the invention comprises a receiver which receives SBAS correction data for the satellite navigation from an SBAS satellite. A converter is provided to convert the received SBAS correction data into GBAS correction data. A merger or message builder is provided to merge the converted GBAS correction data with FAS data which describe a set approach path of an aircraft to form GLS data packets. A transmitter transmits the GLS data packets via a radio link to the aircraft for a satellite navigation-based automatic landing.

The converter or the message builder may complement correction data which are missing in the SBAS correction data for the satellite navigation as compared to the GBAS standard. These missing correction data may be generated by a correction data generator from the available SBAS correction data.

For providing raw data for the set approach path, a path data storage and/or a path data input device may be provided. The message builder may merge the raw data of the set approach path with data from a navigation database the form the FAS data describing the set approach path.

The entire apparatus according to the invention may be located on the ground or on board of an aircraft.

Now referring in greater detail to the drawing, the apparatus 1 depicted in FIG. 1 comprises a central unit 2 to which a receiver 3 and a transmitter 19 are connected. The receiver 3 receives SBAS correction data 4 according to SBAS (Satellite-Based Augmentation System) standard from an SBAS satellite 5. For this purpose, the receiver 3 may comprise an antenna 6 extended as compared to a standard GNSS (Global Navigation Satellite System) antenna or a special antenna for SBAS correction data 4 only. Here and in the following, it is not explicitly differentiated between the signals which the receiver 3 receives with the antenna 6 from the SBAS satellite 5 and the SBAS correction data 4 encoded therein. The receiver 3 forwards the SBAS correction data 4 to the central unit 2 of the apparatus 1. Here, the SBAS correction data 4 are converted by a converter 7 into GBAS correction data 8 according to GBAS standard. These GBAS correction data 8 are output by the converter 7 to a merger or message builder 9. The message builder 9 may complement correction data 10 which are missing in the converted SBAS correction data 4 converted into GBAS correction data 8 as compared to complete correction data according to GBAS standard. The message builder 9 receives these missing correction data 10 from a correction data generator 11 which generates them from the available correction data 8. The GLS (GBAS Landing System) data packets 12 formed by the message builder 9 also include FAS (Final Approach Segment) data describing a set approach path. These FAS data are produced from raw data 13 which either origin from a path data storage 14 or a path data input device 15 and from data 16 provided by a navigation data base 17. The path data input device 15 may provide the raw data 13 on basis of fundamental values like approach direction and glide angle which are input via a user surface. The DLS data packets 12 are combined by the message builder 9 such that they allow for a GLS landing, i.e. a satellite navigation-based automatic landing, of an aircraft 18 to which the data packets 12 are transmitted by the transmitter 19. The transmitter 19 comprises an antenna 20, particularly a VHF antenna, by which the data packets 12 according to GLS standard are transmitted to the aircraft 18 via a radio link 21.

When the apparatus 1 is installed in the aircraft 18 itself, the path data storage has to include raw data 13 for set approach paths to all airports approached by the aircraft 18 on which a satellite navigation-based automatic landing of the aircraft 18 shall be possible, or suitable inputs into the path data input device 15 have to be made for any airports not covered by the raw data 13.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of providing GLS (GBAS (Ground-Based Augmentation System) Landing System) data packets for a satellite navigation-based automatic landing of an aircraft, wherein the GLS data packets include GBAS correction data for a satellite navigation and FAS (Final Approach Segment) data describing a set approach path of the aircraft, the method comprising
   receiving SBAS (Satellite-Based Augmentation System) correction data for the satellite navigation from an SBAS satellite,
   converting the received SBAS correction data into GBAS correction data,
   merging the GBAS correction data obtained by converting the SBAS correction data with the FAS data describing the set approach path to form GLS data packets, and
   transmitting the GLS data packets via a radio link to parts of the aircraft implementing a GLS,
   wherein, in converting the SBAS correction data into the GBAS correction data, correction data are complemented that are missing in the received SBAS correction data as compared to complete GBAS correction data according to GBAS standard as the missing correction data are not included in the correction data according to the SBAS standard; and
   wherein all preceding steps are carried out on board of the aircraft by an apparatus completely separated from the parts of the aircraft implementing the GLS.

2. The method of claim 1, wherein the missing correction data are generated from the received SBAS correction data.

3. The method of claim 1, wherein raw data describing the set approach path are taken from a path data storage or a path data input device.

4. The method of claim 3, wherein the raw data describing the set approach are combined with data from a navigation database to form the FAS data.

5. An apparatus for providing GLS (GBAS (Ground-Based Augmentation System) Landing System) data packets for a satellite navigation-based automatic landing to an aircraft, wherein the GLS data packets include GBAS correction data for a satellite navigation and FAS (Final Approach Segment) data, which describe a set approach path of the aircraft, the apparatus comprising
   a receiver configured to receive SBAS correction data for the satellite navigation from an SBAS satellite,
   a converter connected to the receiver and configured to convert the SBAS correction data received by the receiver into GBAS correction data,
   a message builder connected to the converter and configured to combine the GBAS correction data for the satellite navigation received by the converter with FAS data, which describe the set approach path of the aircraft, to form GLS data packets for the satellite navigation-based automatic landing of the aircraft, and
   a transmitter connected to the message builder and configured to transmit the GLS data packets via a radio link to parts of the aircraft implementing a GLS, wherein the converter or the message builder is configured to complement correction data that are missing in the received SBAS correction data as compared to complete GBAS correction data according to GBAS standard as the missing correction data are not included in the correction data according to the SBAS standard; and wherein the apparatus is located on board of the aircraft and completely separated from the parts of the aircraft implementing the GLS.

6. The apparatus of claim 5, wherein the converter or the message builder comprises a correction data generator that is configured to generate the missing correction data from the SBAS correction data received by the receiver.

7. The apparatus of claim 5, further comprising at least one of a path data storage and a path data input device connected to the message builder and configured to provide raw data for the set approach path.

8. The apparatus of claim 7, wherein the message builder is connected to a navigation database and configured to combine the raw data for the set approach path with data from the navigation database to form the FAS data.

\* \* \* \* \*